US011429391B2

(12) United States Patent
Liu et al.

(10) Patent No.: US 11,429,391 B2
(45) Date of Patent: Aug. 30, 2022

(54) SPECULATIVE EXECUTION OF CORRELATED MEMORY ACCESS INSTRUCTION METHODS, APPARATUSES AND SYSTEMS

(71) Applicant: Alibaba Group Holding Limited, Grand Cafyman (KY)

(72) Inventors: Dongqi Liu, Hangzhou (CN); Chang Liu, Hangzhou (CN); Yimin Lu, Hangzhou (CN); Tao Jiang, Hangzhou (CN); Chaojun Zhao, Hangzhou (CN)

(73) Assignee: Alibaba Group Holding LImited, Grand Cayman (KY)

( * ) Notice: Subject to any disclaimer, the term of this patent is extended or adjusted under 35 U.S.C. 154(b) by 0 days.

(21) Appl. No.: 17/005,100

(22) Filed: Aug. 27, 2020

(65) Prior Publication Data

US 2021/0089318 A1 Mar. 25, 2021

(30) Foreign Application Priority Data

Sep. 20, 2019 (CN) .......................... 201910892195.8

(51) Int. Cl.
  *G06F 9/38* (2018.01)
  *G06F 9/32* (2018.01)
  (Continued)

(52) U.S. Cl.
  CPC ........ *G06F 9/3842* (2013.01); *G06F 9/30043* (2013.01); *G06F 9/30101* (2013.01);
  (Continued)

(58) Field of Classification Search
  None
  See application file for complete search history.

(56) References Cited

U.S. PATENT DOCUMENTS

| 5,887,152 A * | 3/1999 | Tran ...................... G06F 9/3857 712/217 |
| 6,907,520 B2 * | 6/2005 | Parady .................... G06F 9/383 712/228 |

(Continued)

FOREIGN PATENT DOCUMENTS

EP 2707794 10/2017

OTHER PUBLICATIONS

Resit Sendag, "Address Correlation: Exceeding the Limits of Locality", Jan. 30, 2004, University of Rhode Island (Year: 2004).*

*Primary Examiner* — Hyun Nam

(57) ABSTRACT

A processor core, a processor, an apparatus, and an instruction processing method are disclosed. The processor core includes: an instruction fetch unit, where the instruction fetch unit includes a speculative execution predictor and the speculative execution predictor compares a program counter of a memory access instruction with a table entry stored in the speculative execution predictor and marks the memory access instruction; a scheduler unit adapted to adjust a send order of marked memory access instructions and send the marked memory access instructions according to the send order; an execution unit adapted to execute the memory access instructions according to the send order. In the instruction fetch unit, a memory access instruction is marked according to a speculative execution prediction result. In the scheduler unit, a send order of memory access instructions is determined according to the marked memory access instruction and the memory access instructions are sent. In the execution unit, the memory access instructions are executed according to the send order. This helps avoiding re-execution of a memory access instruction due to an address correlation of the memory access instruction. Consequently, this eliminates the need of adding an idle cycle in (Continued)

an instruction pipeline and the need of refreshing the pipeline to clear a memory access instruction that is incorrectly speculated.

17 Claims, 4 Drawing Sheets

(51) Int. Cl.
  *G06F 9/30* (2018.01)
  *G06F 13/16* (2006.01)
  *G06F 9/48* (2006.01)

(52) U.S. Cl.
  CPC .......... *G06F 9/30145* (2013.01); *G06F 9/321* (2013.01); *G06F 9/4881* (2013.01); *G06F 13/1668* (2013.01)

(56) References Cited

U.S. PATENT DOCUMENTS

| | | | |
|---|---|---|---|
| 2002/0078061 A1* | 6/2002 | Wong | G06F 12/0862 |
| 2003/0149862 A1* | 8/2003 | Kadambi | G06F 9/3838 |
| | | | 712/E9.05 |
| 2004/0243767 A1* | 12/2004 | Cierniak | G06F 12/0862 |
| | | | 712/E9.047 |
| 2009/0187904 A1* | 7/2009 | Serebrin | G06F 9/45537 |
| | | | 718/1 |
| 2010/0169626 A1* | 7/2010 | Wang | G06F 9/3848 |
| | | | 712/239 |
| 2011/0131452 A1* | 6/2011 | Kumar | G06F 11/263 |
| | | | 714/34 |
| 2011/0320787 A1* | 12/2011 | Dieffenderfer | G06F 9/30003 |
| | | | 712/234 |
| 2016/0139933 A1* | 5/2016 | Srikantaiah | G06F 9/3832 |
| | | | 712/240 |
| 2019/0294467 A1* | 9/2019 | Yamada | G06F 9/30036 |

* cited by examiner

SPECULATIVE EXECUTION OF CORRELATED MEMORY ACCESS INSTRUCTION METHODS, APPARATUSES AND SYSTEMS

CROSS-REFERENCE TO RELATED APPLICATIONS

This application claims the benefit of Chinese Patent Application No. 201910892195.8 filed Sep. 20, 2019, which is incorporated herein in its entirety.

TECHNICAL FIELD

The present invention relates to the field of chip manufacturing, and more specifically, to a processor core, a processor, an apparatus, and an instruction processing method.

BACKGROUND OF THE INVENTION

Processor architecture improvement is a very difficult task. Research and development personnel put a lot of effort into this and expect to make progress in even a tiniest aspect. In design of high-performance processors, a concept of speculative execution is typically introduced for performance considerations. In this way, when a current instruction fails to be sent in order due to a correlation, a subsequent instruction without the correlation is sent for execution ahead of schedule.

In related technologies, a correlation between general instructions involves only a register correlation. To be specific, a source register of an instruction is a destination register of its previous instruction. However, a correlation between memory access instructions may further involve an address correlation. To be specific, a memory read address and a memory write address are correlated. When a memory access instruction is sent, only a register correlation can be detected and an address correlation cannot be detected. The address correlation is discovered through address calculation only when the memory access instruction is executed. Therefore, in speculative execution, a load instruction (load instruction) may be executed prior to a store instruction (store instruction) that has an address correlation to the load instruction, causing data loaded by using the load instruction (load instruction) to be incorrect. In this case, the load instruction (load instruction) needs to be re-executed after the store instruction (store instruction) is executed. This increases idle cycles in an instruction pipeline, reducing execution efficiency of programs and processors. In addition, when a speculation failure occurs, although a memory access instruction that is incorrectly speculated can be cleared by refreshing the pipeline, the pipeline refresh also causes performance loss because the memory access instruction is already executed when the speculation failure is identified. A deeper pipeline means greater performance loss.

SUMMARY OF THE INVENTION

In view of this, the present solution proposes a processor core, a processor, an apparatus, and an instruction processing method to resolve the above problem.

To achieve this objective, according to a first aspect of the present invention, the present invention provides a processor core, including:

an instruction fetch unit, where the instruction fetch unit includes a speculative execution predictor, and the speculative execution predictor compares a program counter of a memory access instruction with a table entry stored in the speculative execution predictor and marks the memory access instruction accordingly, where the memory access instruction is a load instruction or a store instruction, and the table entry is program counters of a load instruction and a store instruction that have an address correlation;

a scheduler unit adapted to adjust a send order of marked memory access instructions and send the marked memory access instructions to an execution unit; and the execution unit adapted to execute the marked memory access instructions according to the send order.

In some embodiments, the instruction fetch unit includes a register set adapted to store the table entry.

In some embodiments, the speculative execution predictor is further adapted to: update a table entry in the speculative execution predictor according to a speculative execution prediction result of the memory access instruction.

In some embodiments, the register set further includes a plurality of register groups, and each register group includes a saturation counter and one or two PC registers adapted to store one table entry.

In some embodiments, the speculative execution predictor starts speculative prediction when a value of the saturation counter is greater than a first given value and terminates the speculative prediction when the value of the saturation counter is less than a second given value, and the first given value is greater than the second given value.

In some embodiments, for one pair of a store instruction and a load instruction, the speculative execution predictor increases the value of the saturation counter according to a speculative prediction error before starting speculative prediction and decreases the value of the saturation counter according to a speculative prediction error after starting the speculative prediction.

In some embodiments, the instruction fetch unit further includes a pre-decoding unit adapted to distinguish a general instruction and a memory access instruction, and send the general instruction to the scheduler unit and the memory access instruction to the speculative execution predictor.

In some embodiments, the speculative execution predictor only marks a load instruction that is expected to fail speculative execution.

In some embodiments, the speculative execution predictor only marks a store instruction that is expected to fail speculative execution.

In some embodiments, the scheduler unit sends a marked load instruction after a marked store instruction is sent.

In some embodiments, the scheduler unit includes an instruction send queue and a send blocking execution module, where the instruction send queue is used to buffer every instruction received; and the send blocking execution module is adapted to block the marked load instruction and send the marked load instruction after the marked store instruction is sent.

In some embodiments, the processor core further includes a retirement unit, where the retirement unit includes a prediction result summary module, where the prediction result summary module is adapted to summarize a speculative prediction result and provide the speculative execution prediction result of the memory access instruction to the speculative execution predictor.

According to a second aspect of the present invention, a processor is provided, where the processor includes the processor core according to any one of the above embodiments.

According to a third aspect of the present invention, a system-on-chip is provided, where the system-on-chip includes the processor core according to any one of the above embodiments.

According to a fourth aspect of the present invention, an apparatus is provided, where the apparatus includes a memory coupled by using a bus, and the processor according to the above embodiments.

According to a fifth aspect of the present invention, an instruction processing method is provided, where the instruction processing method includes:

acquiring an instruction packet;

pre-decoding the instruction packet to distinguish a memory access instruction and a general instruction in the instruction packet, where the memory access instruction is a load instruction or a store instruction, and the general instruction is an instruction other than the memory access instruction in an instruction set;

performing speculative prediction on a pair of memory access instructions in the instruction packet, and marking the memory access instructions according to the speculative prediction;

adjusting a send order of marked memory access instructions and sending the marked memory access instructions according to the send order and executing the memory access instructions according to the send order.

In some embodiments, the adjusting a send order of marked memory access instructions and the general instruction and sending the marked memory access instructions according to the send order includes: sending a marked load instruction after a marked store instruction is sent.

Compared with the prior art, the embodiments of the present invention have the following advantages:

The instruction fetch unit performs speculative prediction on a memory access instruction and marks the memory access instruction according to a prediction result. The scheduler unit adjusts a send order of memory access instructions according to the marked memory access instruction. The execution unit executes the memory access instructions according to the send order. This helps avoiding re-execution of a memory access instruction due to an address correlation of the memory access instruction. As a result, this eliminates the need of adding an idle cycle in an instruction pipeline and the need of refreshing the pipeline to clear a memory access instruction that is incorrectly speculated, so that processor performance is unaffected.

BRIEF DESCRIPTION OF THE DRAWINGS

The above and other objectives, features and advantages of the present invention will become more apparent from the description of the embodiments of the present invention with reference to the following accompany drawings. In the drawings.

DETAILED DESCRIPTION OF THE INVENTION

The present invention is described below based on embodiments, but the present invention is not limited to these embodiments. In the following detailed description of the present invention, some specific details are described. Without such details, those skilled in the art can still fully understand the present invention. To avoid confusing the essence of the present invention, well-known methods, processes, and procedures are not described in detail. In addition, the accompany drawings are not necessarily drawn to scale.

The following terms are used herein.

Program PC: A program counter.

Instruction pipelining: Instruction pipelining is a method of improving efficiency of a processor in executing instructions. In this method, processing of an instruction is divided into a plurality of steps of micro-operations and each step is completed by a dedicated circuit. Currently, mainstream instruction pipelining techniques include three-stage, four-stage, five-stage, seven-stage, and super-stage instruction pipelines. For example, a five-stage instruction pipeline illustrated in textbooks includes an instruction fetch stage, a decoding stage, an execution stage, a memory access stage, and a write-back stage. The instruction fetch stage, the decoding stage, the execution stage, the memory access stage, and the write-back stage are referred to as an instruction fetch unit, a decoding unit, an execution unit, a memory access unit, and a retirement unit herein, respectively. A combination of software and hardware that implements instruction pipelining is referred to as an instruction pipeline structure.

Instruction packet: An instruction packet refers to a fixed-length binary segment acquired by a processor from an instruction high-speed cache or an external bus.

In addition, it should be particularly noted that the description of "update a table entry in the speculative execution predictor" herein may include the following: changing one or more fields of an existing table entry in a speculative execution predictor; or adding a new table entry in a speculative execution predictor. A table entry herein refers to a group of related data items.

Figure 1:
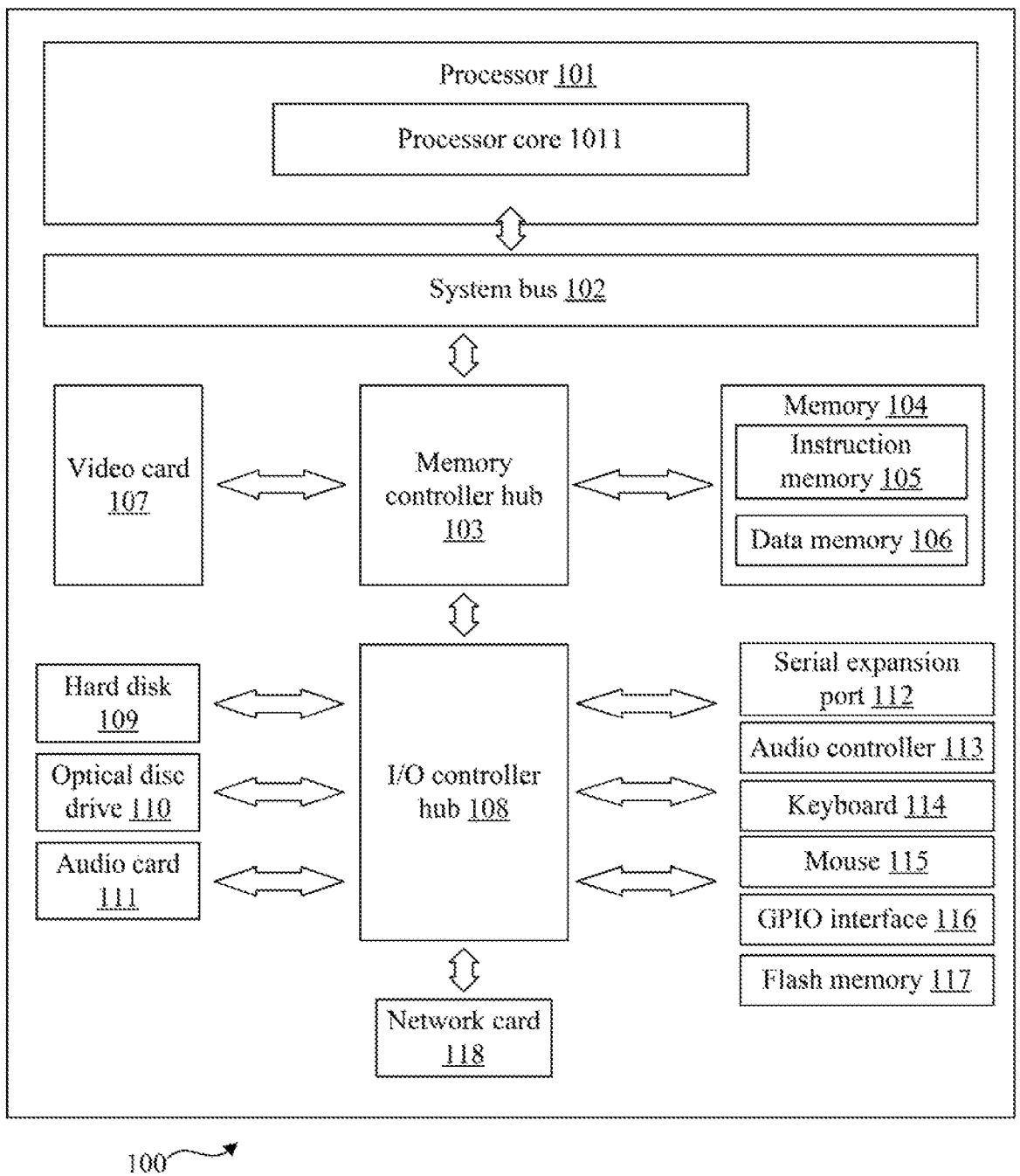
FIG. 1 is a schematic structural diagram of a system according to an embodiment of the present invention.

FIG. 1 is a schematic structural diagram of a system according to an embodiment of the present invention. For example, the system is a computer system. A system 100 is an example of a "central" system architecture. The system 100 may be constructed based on various types of processors available in the current marketplace, and driven by an operating system such as a WINDOWS™ operating system, a UNIX operating system, or a Linux operating system. In addition, the system 100 is typically implemented in PCs, desktop computers, notebooks, and servers. Therefore, the system 100 in the embodiment of the present invention is not limited to any specific combination of hardware circuits and software.

As shown in FIG. 1, the system 100 includes a processor 101. The processor 101 has data processing capabilities known in the art. The processor 101 may be a processor with a complex instruction set computing (CISC) architecture, a reduced instruction set computing (RISC) architecture, or a very long instruction word (VLIW) architecture, a processor that implements a combination of the above instruction sets, or any processor device built for a special purpose.

The processor 101 is coupled to a system bus 102. The system bus 102 may be an interconnection circuit adapted to connect the processor 101 and various other components, and the interconnection circuit may support various interconnection protocols and interface circuits required for different needs. Therefore, a communication relationship between the processor 101 and various components is implemented. The processor 102 further includes a processor core 1021 improved according to the technical solution provided in the embodiments of the present invention, and specific details are provided in the following descriptions.

The system 100 further includes a memory 104 and a video card 107. The memory 104 may be a dynamic random access memory (DRAM), a static random access memory (SRAM), a flash memory, or other memories. The memory 104 includes an instruction memory 105 and a data memory 106. Instruction information and data information that are represented by data signals are stored separately. Therefore, when executing an instruction stream, the processor 101 can simultaneously fetch an instruction from the instruction memory 105 and fetch data from the data memory 106. The video card 107 includes a display driver adapted to control correct display of a display signal on a screen.

The system 100 further includes a memory controller hub (MCH) 103. The memory controller hub (MCH) 103 may be coupled to the system bus 102, the memory 104, the video card 107, and an I/O controller hub (ICH) 108. The processor 101 may communicate with the memory controller hub (MCH) 103 by using the system bus 102. The memory controller hub (MCH) 103 provides a high-bandwidth memory access path for the memory 104 to store and fetch instruction information and data information. Further, the memory controller hub (MCH) 103 and the video card 107 transmit display signals based on a signal input/output interface of the video card. For example, the signal input/output interface of the video card is of a DVI type or an HDMI type.

The memory controller hub (MCII) 103 transmits digital signals between the processor 101, the memory 104, and the video card 107, and also bridges digital signals between the system bus 102, the memory 104, and the I/O controller hub (ICH) 108.

The system 100 further includes the I/O controller hub (ICH) 108. The input/output controller hub (ICH) 108 is coupled to the memory controller hub (MCH) 103 by using a dedicated hub interface bus, and connected to some I/O devices by using a local I/O bus. The local I/O bus is adapted to couple a peripheral device to the input/output control hub (ICH) 108, so that the peripheral device is further coupled to the memory controller hub (MCH) 103 and the system bus 102. Peripheral devices include, but are not limited to, the following devices: a hard disk 109, an optical disc drive 110, an audio card 111, a serial expansion port 112, an audio controller 113, a keyboard 114, a mouse 115, a GPIO interface 116, a flash memory 117, and a network card 118.

Certainly, different computer systems have different structural diagrams depending on their motherboards, operating systems, and instruction set architectures. For example, currently in many computer systems, the memory controller hub (MCH) 103 is integrated into the processor 101, so that the input/output control hub (ICH) 108 becomes a control hub coupled to the processor 101.

Figure 2:
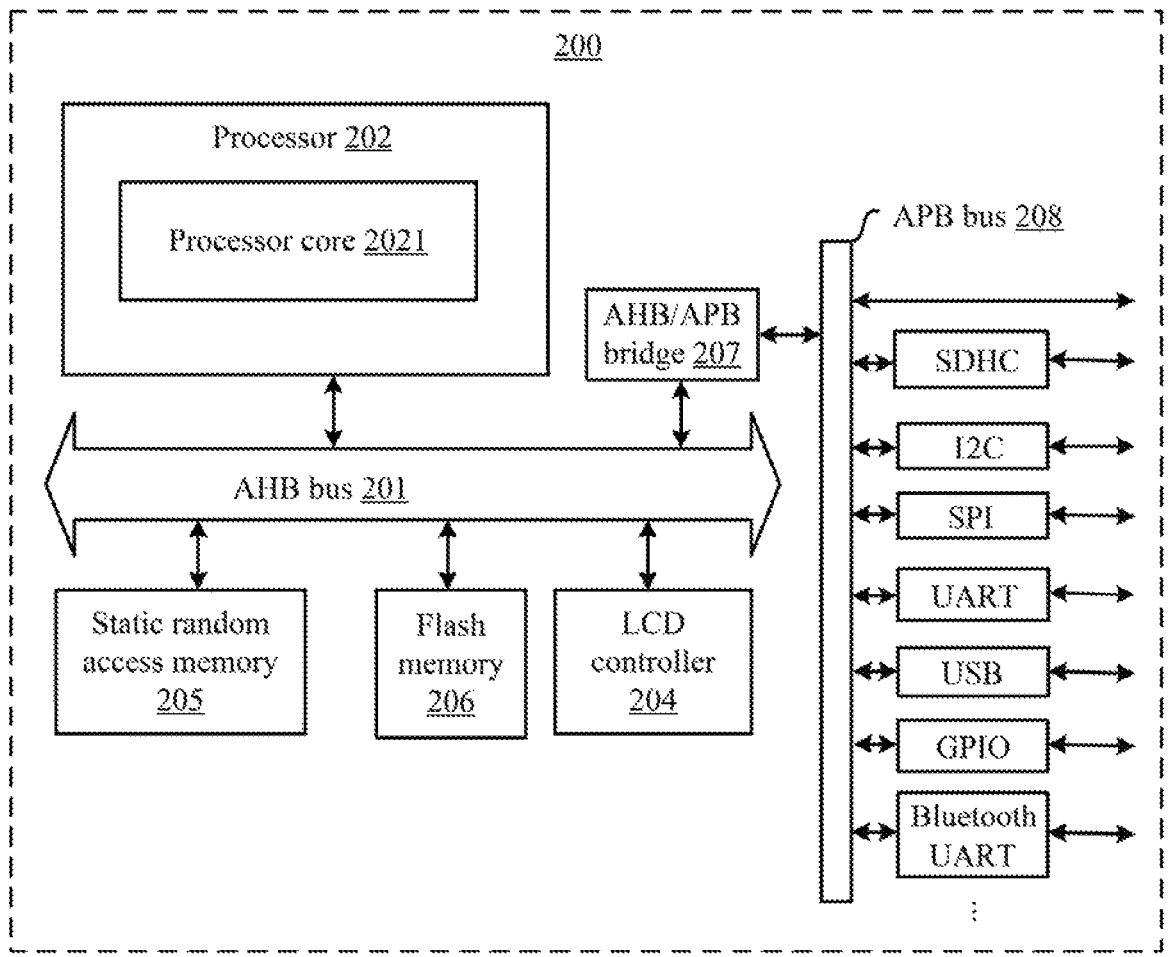
FIG. 2 is a schematic structural diagram of a system-on-chip according to an embodiment of the present invention.

FIG. 2 is a schematic structural diagram of a system-on-chip 200 adapted to implement an embodiment of the present invention. As a system-on-chip, the system 200 may be produced and sold as a separate device, or may be combined with other components to form a new device for production and sale.

The system 200 can be manufactured using many models of processors sold in the current marketplace and driven by operating systems such as WINDOWS™, UNIX, Linux, Android, and RTOS. The system 200 may be implemented in computer devices, handheld devices, and embedded products. Some examples of the handheld device include cellular phones, Internet Protocol devices, digital cameras, personal digital assistants (PDAs), and handheld PCs. The embedded products may include network computers (NetPC), set-top boxes, network hubs, wide area network (WAN) switches, or any other systems that can execute one or more instructions.

As shown in FIG. 2, the system 200 includes a processor 202, a static random access memory 205, an LCD controller 204, a flash memory 206, and an AHB/APB bridge 207 that are coupled by using an AHB (advanced high performance bus, a system bus) bus 201.

The processor 202 may be one of a complex instruction set computing (CISC) microprocessor, a reduced instruction set computing (RISC) microprocessor, a very long instruction word (VLIW) microprocessor, a microprocessor implementing a combination of the above instruction sets, or any other processor devices. The processor 202 further includes a processor core 2021 improved according to the technical solution provided in the embodiments of the present invention, and specific details are provided in the following descriptions.

The static random access memory 205 and the flash memory 206 are adapted to store instruction information and/or data information represented by data signals. For example, the static random access memory 205 can be adapted to provide a running space for various application programs to create heaps and stacks and store intermediate data for the various application programs. The flash memory 206 can store executable code of the various application programs and executable code of the operating system.

The AHB bus 201 is adapted to transmit digital signals between high-performance modules of the system 200, for example, between the processor 202 and the static random access memory 205, between the processor 202 and the LCD controller 204, between the processor 202 and the flash memory 206, and between the processor 202 and the AHB/APB bridge 207.

The AHB/APB bridge 207 is adapted to bridge data transmission between the AHB bus and an APB bus. The AHB/APB bridge 207 latches address, data, and control signals acquired from the AHB bus and provides secondary decoding to generate APB peripheral device selection signals, thereby implementing a conversion from an AHB protocol to an APB protocol.

The system 200 may further include various interfaces coupled to the APB bus. The various interfaces include, but are not limited to, the following interface types: SDHC (Secure Digital High Capacity), 12C bus, serial peripheral interface (SPI, Serial Peripheral Interface), universal asynchronous receiver/transmitter (UART, Universal Asynchronous Receiver/Transmitter), universal serial bus (USB, Universal Serial Bus), general-purpose input/output (GPIO, General-purpose input/output), and Bluetooth UART. The peripheral devices coupled to the interfaces are, for example, USB devices, memory cards, packet transceivers, and Bluetooth devices.

It is worth pointing out that as SoC design becomes more complex and processing power of processors continues to increase, performance limitations of bus structures lead to bus structure upgrades. For example, the ARM company has introduced a higher-performance AXI (advanced extensible interface) bus on the basis of the above AHB bus. Therefore, the AHB bus 201 in the figure may be replaced with the AXI bus. In addition, research and development personnel in the art may also improve an existing bus structure or build a new bus structure, based on their actual needs. Therefore, although the figure illustrates the SoC by using an AHB bus, actually various types of buses are available to the SoC.

In addition, it should also be noted that the systems shown in FIG. 1 and FIG. 2 are used only to illustrate some application scenarios of the embodiments of the present invention, but are not intended to limit the embodiments of the present invention. According to the present invention, an existing processor or processor core is improved. Therefore, the present invention is theoretically applicable to systems with any processor architecture and instruction set architecture.

Figure 3:
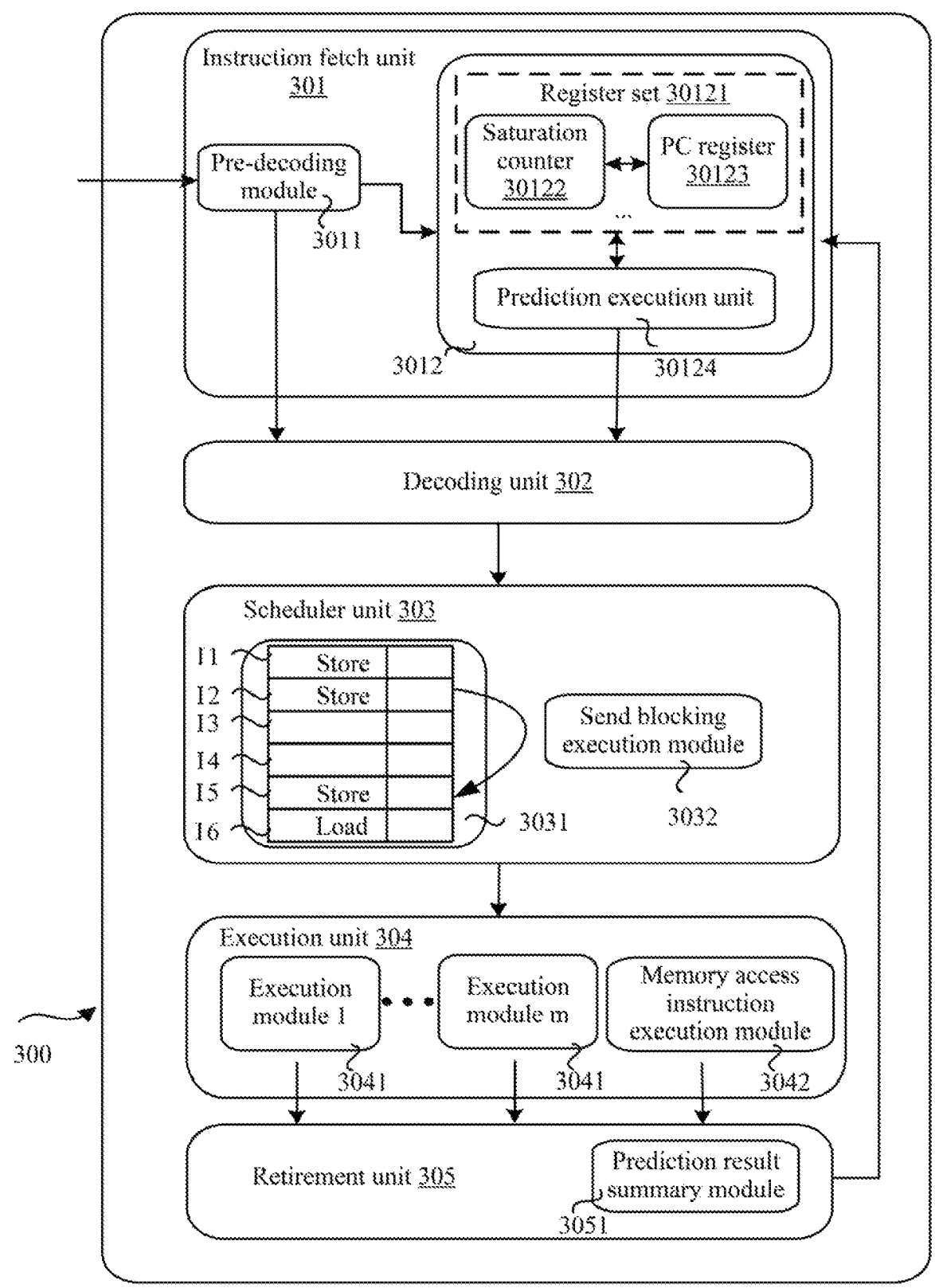
FIG. 3 is a schematic structural diagram of a processor core according to an embodiment of the present invention.

FIG. 3 is a schematic structural diagram of a processor core according to an embodiment of the present invention. In the figure, an arrow indicates a coupling relationship between two or more units and a data transmission direction between two units.

A processor core 300 includes a pipeline structure. The pipeline structure is used to fetch, decode, and execute program code according to an instruction set encapsulated in the processor core. As shown in FIG. 3, the processor core 300 includes an instruction fetch unit 301, a decoding unit 302, a scheduler unit 303, an execution unit 304, and a retirement unit 305.

In the pipeline structure of the processor core, the fetch unit 301 may be coupled to an instruction cache (not shown) in the processor core 300 to acquire a physical address from a conversion detection buffer according to a program counter (program PC) and acquire an instruction packet from the instruction cache according to the physical address.

In some embodiments, the instruction fetch unit 301 may further include a pre-decoding module 3011 and a speculative execution predictor 3012. The pre-decoding module 3011 pre-decodes an instruction meta field in the instruction packet acquired by the instruction fetch unit 301, to determine an instruction type of each instruction. Instruction types may include general instructions and memory access instructions. Memory access instructions herein include store instructions (store instruction) and load instructions (load instruction). General instructions herein may be instructions other than the memory access instructions and include branch instructions and data transfer instructions.

When the pre-decoding module 3011 determines that a current instruction is a general instruction, it sends the current instruction to the decoding unit 302. When the pre-decoding module 3011 determines that an instruction is a memory access instruction, it sends the memory access instruction to the speculative execution predictor 3012 for speculative prediction. The speculative execution predictor 3012 is adapted to: compare a program counter of the current memory access instruction with a program counter of a load instruction and/or a program counter of a store instruction that are/is stored in the speculative execution predictor, to acquire a search result of the current memory access instruction; mark at least one of a load instruction and a store instruction according to the search result; and send the marked instruction to the decoding unit 302.

In some embodiments, the speculative execution predictor 3012 may further include a register set 30121 and a prediction execution unit 30124. The register set 30121 is coupled to a prediction result summary module 3051 of the retirement unit 305, and receives a speculative execution prediction result (including a prediction error result and/or a prediction success result) returned by the prediction result summary module 3051.

The register set 30121 stores a table entry of program counters of a load instruction and a store instruction that have an address correlation. The register set 30121 may further include a plurality of register groups, and each register group includes a saturation counter 30122 and one or two PC registers 30123. The one or two PC registers 30123 are adapted to store one table entry of program counters of a load instruction and a store instruction that have an address correlation. The speculative execution predictor 3012 starts or terminates speculative prediction based on a value of the saturation counter 30122. Specifically, in an initial stage, no table entry of a load instruction and a store instruction that have an address correlation is stored in the register. Therefore, when the load instruction and the store instruction are executed, a prediction error result is returned to the speculative execution predictor 3012, and the speculative execution predictor 3012 adds a table entry of the load instruction and the store instruction to the one or two PC registers 30123 and sets the value of the saturation counter 30122 to 1. When a speculation failure occurs again to the pair of the load instruction and the store instruction, the value of the saturation counter is increased by 1. When the speculation failure occurs for a third time, the value of the saturation counter becomes greater or equal to 2. In this case, speculative prediction is started to mark the load/store instruction. When a speculative prediction error occurs, the count value is decreased by 1. That is, prediction of a memory access instruction is started only when the count value of the saturation counter 30122 is greater than or equal to 2. When the count value is less than 1, prediction of a memory access instruction is terminated. In addition, when the value of the saturation counter 30122 is 0, a corresponding table entry is released, so that a new table entry can be added to a register corresponding to the table entry.

In this way, space of the register set 30121 can be recycled. In the register set 30122, every table entry of program counters of a load instruction and a store instruction that have an address correlation is the most recent. This helps improve the accuracy of speculative prediction.

In some embodiments, the prediction execution unit 30124 only marks a load instruction (load instruction) that is predicted to fail speculative execution in the execution unit 304. In other embodiments, the prediction execution unit 30124 only marks a store instruction (store instruction) that is predicted to fail speculative execution in the execution unit 304.

The decoding unit 302 extracts operation code, a source register, a destination register, and an immediate operand of the current instruction according to an instruction set architecture. The instruction set architecture is determined by a processor manufacturer. When a program is compiled into an executable form, a compiler uses instructions defined in the instruction set architecture to organize executable code. If the compiler uses an undefined instruction, the decoding unit 302 is unable to understand the meaning conveyed by the instruction, so that the instruction fails to be decoded.

The scheduler unit 303 is adapted to adjust a send order of a plurality of instructions received and send them to the execution unit 304 according to the send order. The plurality of instructions of the scheduler unit 303 may be from an instruction packet fetched by the instruction fetch unit 301 at one time, or from instruction packets fetched by the instruction fetch unit 301 at a plurality of times. The scheduler unit 303 may adjust the send order in a plurality of ways. For example, for a store instruction and a load instruction marked as a pair, the store instruction is sent before the load instruction. For another example, every marked store instruction is sent before a load instruction.

In some embodiments, the scheduler unit 303 may further include an instruction send queue 3031 and a send blocking execution module 3032. The scheduler unit 303 receives the decoded current instruction and stores it in the instruction send queue 3031 in order, but sends each current instruction that has a ready source operand and that is in the send queue 3031 in an out-of-order manner. For example, an instruction I3 and an instruction I4 have a register correlation, and, in the instruction send queue 3031, the instruction I3 is to be sent after the instruction I4 and a source register of the instruction I3 is a destination register of the instruction I4. In this case, the instruction send queue 3031 sends the instruction I4 before the instruction I3 to avoid performance loss of the processor core caused by a speculative execution failure due to the register correlation. If a current instruction I6 to be sent is a marked load instruction (load instruction), and, in the instruction send queue 3031, an instruction I2 and an instruction I5 are marked store instructions (store instructions) and an instruction I1 is an unmarked store instruction (store instruction), the send blocking execution module 3032 blocks sending of the instruction I6, and sends the instruction I6 after the instruction I2 and the instruction I5 are both sent.

In other embodiments, the scheduler unit 303 may speculatively execute a marked store instruction in a selective manner. For example, in some cases, the scheduler unit 303 receives the decoded current instruction (including the marked store instruction) and stores it in the instruction send queue 3032 in order, and then sends each current instruction that has a ready source operand and that is in the send queue 3031. That is, the scheduler unit 303 skips speculative execution of the store instruction. Whether speculative execution is to be performed may depend on, for example, whether blocking exists in the scheduler unit 303. Optionally, a quantity of instructions in the instruction send queue 3032 is used as a condition to determine whether blocking exists in the scheduler unit 303. When the quantity of instructions is greater than or equal to a given value, speculative execution of a marked store instruction is terminated. Certainly, the present invention is not limited to this. An instruction pipeline structure may select to start or terminate speculative execution based on any condition.

The execution unit 304 may include a plurality of execution modules 3041 (adapted to execute general instructions) and a memory access instruction execution module 3042. The memory access instruction execution module 3042 performs a load operation according to the instruction I6 described in the above example. Based on an execution result of the instruction I6, a speculative execution prediction provided by the instruction fetch unit 301 for the instruction I6 is determined as a success or an error. In the retirement unit 305, the execution unit 304 receives the instruction I5. The memory access instruction execution module 3042 performs a store operation according to the instruction I5. Based on an execution result of the instruction I5, a speculative execution prediction provided by the instruction fetch unit 301 for the instruction I5 is determined as a success or an error. The execution unit 304 receives an instruction I4. The instruction I4 may be a general instruction. The plurality of execution modules 3041 perform various arithmetic operations according to the instruction I4.

The retirement unit 305 writes relevant content into a memory. In some embodiments, the retirement unit 305 may include a prediction result summary module 3051. Based on what determination result is provided by the memory access instruction execution module 3042 regarding a memory access instruction, the prediction result summary module 3051 returns a speculative prediction error result to the speculative execution predictor 3012 when the memory access instruction execution module 3042 determines that the instruction fetch unit 301 fails to provide a speculative prediction of the memory access instruction.

It should be understood that although the instruction fetch unit, decoding unit, scheduler unit, execution unit, and retirement unit are used in the figure to represent the instruction pipeline structure, the present invention is not limited to this. Those skilled in the art may use another instruction pipeline to implement the embodiment. For example, a standard five-stage pipeline structure illustrated in textbooks may be used to implement the embodiment.

Table 1 illustrates an exemplary instruction stream. In order to more intuitively explain how the processor core of the disclosed solution processes an instruction stream, the following description uses the instruction stream shown in Table 1 as an example.

TABLE 1

| | Instruction stream |
|---|---|
| 1 | mov r2,0x120000 |
| 2 | mov r1,0x1 |
| 3 | div r3,r2,r1 |
| 4 | st r2,0x0(r3) |
| 5 | ld r4,0x(r2) |

As shown in the instruction stream in Table 1, a register of a store instruction (store instruction) is different from a register of a load instruction (load instruction). Therefore, the store instruction and the load instruction have no register correlation. However, the store instruction and the load instruction use a same address to read from or write to memory. Therefore, the store instruction (the st instruction in Table 1) and the load instruction (the ld instruction in Table 1) have an address correlation.

Table 2 illustrates an execution timing of the instruction stream of Table 1 in a scenario without speculative execution prediction. The store instruction (store instruction) needs to wait to be executed after a previous division instruction (div instruction) is executed. Execution of the division instruction may need a plurality of cycles, blocking the store instruction in the instruction send queue. Because no register correlation exists, the subsequent load instruction (load instruction) is sent to the memory access instruction execution module 3042 ahead of schedule. Speculative execution of the subsequent load instruction causes a write error. Instruction behavior is shown in Table 2. After the store instruction (store instruction) is retired in the $10^{th}$ cycle, the load instruction (load instruction) is re-executed. This causes the processor core to execute the instruction in the pipeline in a fruitless manner, reducing execution efficiency of the processor core.

TABLE 2

Execution timing of an instruction stream in a scenario
without speculative execution prediction

| cycle | IF (instruction fetch) | ID (decoding) | IS (sending) | EX (execution) | RT (retirement) |
|---|---|---|---|---|---|
| 0 | mov1 | | | | |
| 1 | mov2 | mov1 | | | |
| 2 | Div | mov2 | mov1 | | |
| 3 | St | Div | mov2 | mov1 | |
| 4 | Ld | St | div | mov2 | mov1 |
| 5 | | Ld | st | div | mov2 |
| 6 | | | st | div | |
| | | | ld | | |
| 7 | | | st | Div | |
| | | | ld | | |
| 8 | | | | St | div |
| 9 | | | | | st |
| 10 | Ld | | | | |

Table 3 illustrates an execution timing of the instruction stream of Table 1 in a scenario with speculative execution prediction. Execution of the instruction stream when the speculative execution predictor is added is shown in Table 3. The speculative execution predictor marks the store instruction (store instruction) and the load instruction (load instruction). In the instruction send queue, when the store instruction (store instruction) is not sent, the load instruction (load instruction) cannot be sent prior to the store instruction (store instruction). In this way, all instruction sequences are executed and retired by the $10^{th}$ cycle.

TABLE 3

Execution timing of an instruction stream in a
scenario with speculative execution prediction

| cycle | IF (instruction fetch) | ID (decoding) | IS (sending) | EX (execution) | RT (retirement) |
|---|---|---|---|---|---|
| 0 | mov1 | | | | |
| 1 | mov2 | mov1 | | | |
| 2 | Div | mov2 | mov1 | | |
| 3 | St | Div | mov2 | mov1 | |
| 4 | Ld | St | div | mov2 | |
| 5 | | Ld | St | div | mov1 |
| | | | | | mov2 |
| 6 | | | st | div | |
| | | | ld | | |
| 7 | | | St | div | |
| | | | Ld | | |
| 8 | | | Ld | st | div |
| 9 | | | | ld | st |
| 10 | | | | | ld |

Figure 4:
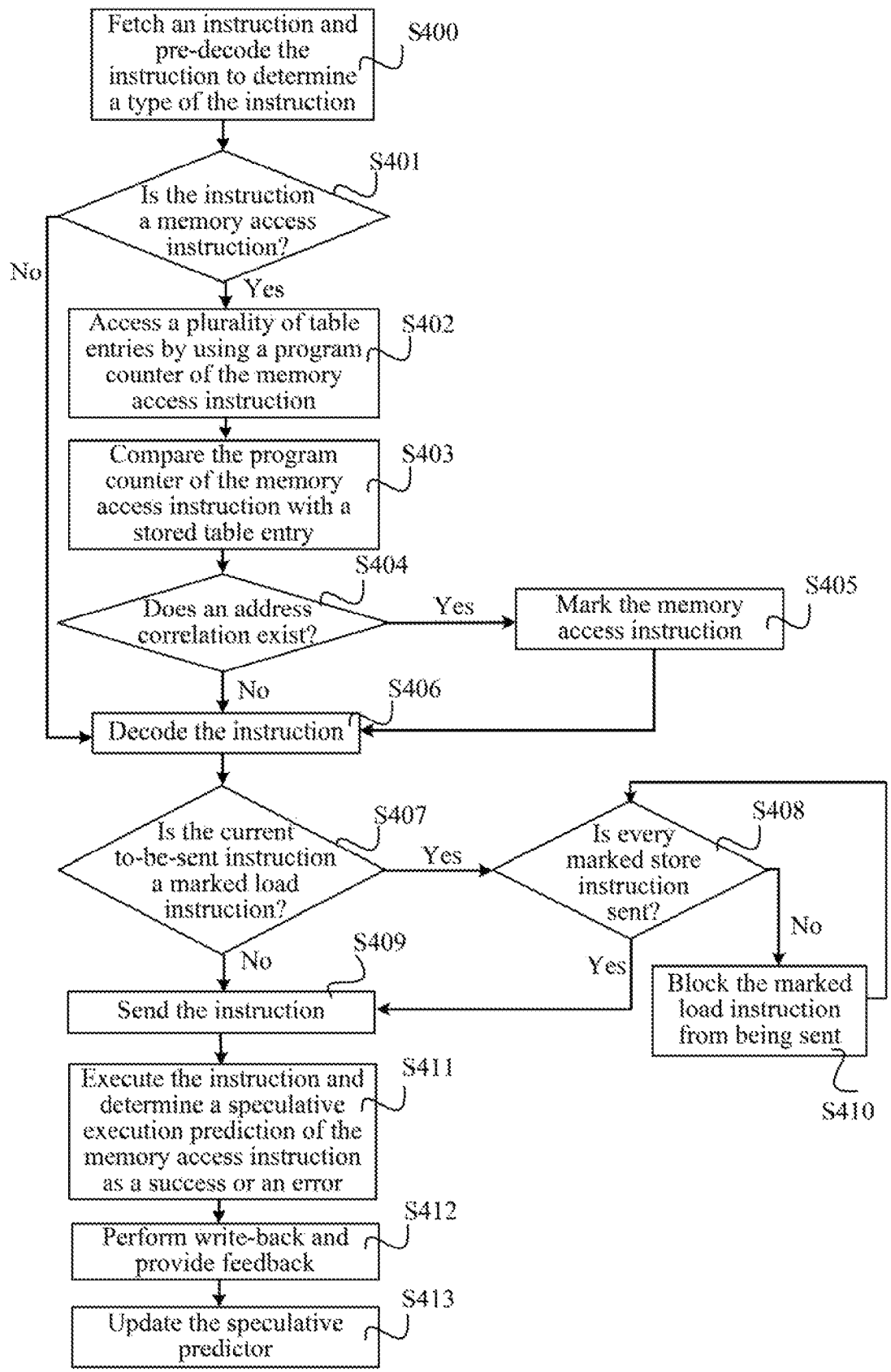
FIG. 4 is a flowchart corresponding to the schematic structural diagram illustrated in FIG. 3.

FIG. 4 is a flowchart corresponding to the schematic structural diagram illustrated in FIG. 3. As shown in the flowchart, a process of the operation is described as follows.

In step S400, an instruction fetch unit obtains an instruction, and a pre-decoding module pre-decodes the instruction to determine an instruction type.

In step S401, it is determined whether the current instruction is a memory access instruction. If yes, stop S402 is performed; otherwise, step S406 is performed.

In step S400 and step S401, the instruction fetch unit acquires an instruction packet from an instruction cache. The instruction packet is pre-decoded to distinguish a memory access instruction and a general instruction. If the current instruction is a memory access instruction, step S402 is performed. If the instruction is a general instruction, step S406 is performed.

In step S402, a program counter PC of the memory access instruction is used to access a plurality of table entries.

In some embodiments, the plurality of table entries may be formed by PC registers, and the PC registers store program PCs of a plurality of memory access instructions with an address correlation. A saturation counter may be a 2-bit saturation counter. The saturation counter counts a program PC of each memory access instruction in the plurality of table entries. A value of the saturation counter is increased by 1 when a new entry is added, and is decreased by 1 when a speculative prediction error is received.

In step S403, the program PC of the memory access instruction is compared with a stored table entry to determine whether an address correlation exists.

In step S404, it is determined whether the address correlation exists. If yes, step S405 is performed; otherwise, step S406 is performed.

In step S405, the memory access instruction is marked and the marked memory access instruction is sent to a decoding unit.

In step S406, the decoding unit performs decoding by extracting operation code, a source register, a destination register, and an immediate operand of the instruction according to an instruction set architecture.

In step S407, the decoded instruction is received and stored in an instruction send queue in order. It is determined whether each to-be-sent instruction in the instruction send queue is a marked load instruction (load instruction). If yes, step S408 is performed; otherwise, step S409 is performed.

In step S408, it is determined whether every marked store instruction (store instruction) in the instruction send queue is sent. If yes, step S409 is performed; otherwise, step S410 is performed.

In step S409, the instruction is sent to an execution unit.

In step S410, the marked load instruction (load instruction) is blocked from being sent, and is sent after every marked store instruction (store instruction) in the instruction send queue is sent.

In step S411, the current instruction is executed by using various execution modules. A memory access instruction execution module performs a store or load operation according to the memory access instruction. Based on an execution result, a speculative execution prediction for the memory access instruction is determined as a success or an error.

In step S412, when a message indicating completion of execution is written back to a register from an instruction pipeline, based on a determination result, a prediction result summary module provides feedback to a saturation counter when the speculative prediction for the memory access instruction is an error.

In step S413, a table entry stored in the speculative execution predictor is updated. The saturation counter decreases a count value of the saturation counter corresponding to the memory access instruction by 1. When the count value of the saturation counter corresponding to the memory access instruction is less than 2, the speculative execution predictor terminates predicting a speculative execution result of the memory access instruction.

In the embodiment of the present invention, the instruction fetch unit performs speculative prediction on a memory access instruction and marks the memory access instruction according to a prediction result. The scheduler unit adjusts a send order of memory access instructions according to the marked memory access instruction. The execution unit executes the memory access instructions according to the send order. This helps avoiding re-execution of a memory access instruction due to an address correlation of the memory access instruction. Consequently, this eliminates the need of adding an idle cycle in an instruction pipeline and the need of refreshing the pipeline to clear a memory access instruction that is incorrectly speculated, so that processor performance is unaffected.

Further, the table entry in the speculative execution predictor is updated according to the speculative prediction result, so that the table entry stored in the speculative execution predictor is a most recent table entry of address correlation. This further helps improve the accuracy of speculative prediction.

Further, the saturation counter reflects confidence of the speculative execution predictor. When the value of the saturation counter is less than a given value, the speculative execution predictor is not used for speculative prediction, thereby avoiding invalid work of the speculative execution predictor.

In the present invention, the above processing unit, processing system, and electronic device may be implemented in hardware, a dedicated circuit, software, or logic, or any combination thereof. For example, some aspects may be implemented in hardware, and other aspects may be implemented in firmware or software executable by a controller, a microprocessor, or other computing devices. The present invention is not limited thereto though. Although the various aspects of the present invention may be illustrated and described as block diagrams or flowcharts, or using some other graphical representations, it is well understood that, as non-limiting examples, the blocks, apparatuses, systems, techniques or methods described herein may be implemented in hardware, software, firmware, a dedicated circuit, logic, general hardware, a controller, or other computing devices, or some combination thereof. If involved, the circuit design of the present invention may be implemented in various components such as an integrated circuit module.

The above are merely preferred embodiments of the present invention and are not intended to limit the present invention. For those skilled in the art, the present invention may have various modifications and variations. Any modification, equivalent replacement, or improvement made without departing from the spirit and principle of the present invention shall fall within the protection scope of the present invention.

What is claimed is:

1. A processor core, comprising:
   an instruction fetch unit, wherein the instruction fetch unit comprises a speculative execution predictor adapted to: compare a program counter of a memory access instruction with a table entry stored in the speculative execution predictor and mark the memory access instruction based on the comparison, wherein the memory access instruction is a load instruction or a store instruction, and wherein the table entry comprises program counters of a load instruction and a store instruction that have an address correlation;
   a scheduler unit adapted to adjust a send order of marked memory access instructions and send the marked memory access instructions to an execution unit; and
   the execution unit adapted to execute the marked memory access instructions according to the send order.

2. The processor core according to claim 1, wherein the instruction fetch unit further comprises a register set adapted to store the table entry.

3. The processor core according to claim 1, wherein the speculative execution predictor is further adapted to: update a table entry in the speculative execution predictor according to a speculative execution prediction result of the memory access instruction.

4. The processor core according to claim 2, wherein the register set further comprises a plurality of register groups, and wherein each register group comprises a saturation counter and one or two program counter (PC) registers adapted to store one table entry.

5. The processor core according to claim 4, wherein the speculative execution predictor is further adapted to start speculative prediction when a value of the saturation counter is greater than a first given value and terminate the speculative prediction when the value of the saturation counter is less than a second given value, and wherein the first given value is greater than the second given value.

6. The processor core according to claim 5, wherein, for one pair of a store instruction and a load instruction, the speculative execution predictor is further adapted to increase the value of the saturation counter according to a speculative prediction error before starting the speculative prediction and decrease the value of the saturation counter according to the speculative prediction error after starting the speculative prediction.

7. The processor core according to claim 1, wherein the instruction fetch unit further comprises a pre-decoding unit adapted to distinguish a general instruction and the memory access instruction and send the general instruction to the scheduler unit and the memory access instruction to the speculative execution predictor.

8. The processor core according to claim 1, wherein the speculative execution predictor only marks a load instruction that is expected to fail speculative execution.

9. The processor core according to claim 1, wherein the speculative execution predictor only marks a store instruction that is expected to fail speculative execution.

10. The processor core according to claim 1, wherein the scheduler unit is further adapted to send a marked load instruction after a marked store instruction is sent.

11. The processor core according to claim 10, wherein the scheduler unit comprises an instruction send queue and a send blocking execution module, wherein:
    the instruction send queue is used to buffer every instruction received; and
    the send blocking execution module is adapted to block the marked load instruction and send the marked load instruction after the marked store instruction is sent.

12. The processor core according to claim 3, further comprising a retirement unit, wherein the retirement unit comprises a prediction result summary module, wherein the prediction result summary module is adapted to summarize the speculative execution prediction result and provide the speculative execution prediction result of the memory access instruction to the speculative execution predictor.

13. A processor, comprising the processor core according to claim 1.

14. A system-on-chip, comprising the processor core according to claim 1.

15. An apparatus, comprising a memory coupled by using a bus, and the processor according to claim 13.

16. An instruction processing method, comprising:
    acquiring an instruction packet;
    pre-decoding the instruction packet to distinguish a memory access instruction and a general instruction in the instruction packet, wherein the memory access instruction is a load instruction or a store instruction, and wherein the general instruction is an instruction other than the memory access instruction in an instruction set;

performing speculative prediction on a pair of memory access instructions in the instruction packet and marking the memory access instructions according to the speculative prediction;

adjusting a send order of the marked memory access instructions and sending the marked memory access instructions according to the send order; and executing the memory access instructions according to the send order.

17. The instruction processing method according to claim 16, wherein the adjusting the send order of the marked memory access instructions and sending the marked memory access instructions according to the send order comprises:

sending a marked load instruction after a marked store instruction is sent.

* * * * *